United States Patent [19]
Knepler

[11] 3,927,400
[45] Dec. 16, 1975

[54] EFFICIENCY MONITORING SYSTEM FOR SEED PLANTING APPARATUS

[75] Inventor: John T. Knepler, Auburn, Ill.

[73] Assignee: Dickey-john Corporation, Auburn, Ill.

[22] Filed: July 16, 1973

[21] Appl. No.: 379,711

[52] U.S. Cl............ 340/276; 235/92 FQ; 250/215; 250/222 PC; 340/239 R
[51] Int. Cl.².......................................... G08B 21/00
[58] Field of Search............ 340/267 R, 271, 239 R, 340/213 Q; 235/92 V, 92 GE, 92 PC, 92 FQ; 250/222 PC, 215

[56] References Cited
UNITED STATES PATENTS

| | | | |
|---|---|---|---|
| 3,527,928 | 9/1970 | Ryder et al. | 340/267 R |
| 3,537,091 | 10/1970 | Schenkenberg | 340/239 R |
| 3,723,989 | 3/1973 | Fathauer et al. | 250/222 PC |
| 3,739,276 | 6/1973 | Dornberger | 235/92 FQ |
| 3,792,460 | 2/1974 | Ratz | 340/271 |

Primary Examiner—Glen R. Swann, III
Attorney, Agent, or Firm—Olson, Trexler, Wolters, Bushnell & Fosse, Ltd.

[57] ABSTRACT

Signal producing devices are associated with a seed planting apparatus to produce signal information corresponding to the desired number of seeds to be planted in each of a plurality of separate planting rows. A seed dispensing nozzle is equipped with seed sensing means for each row and counts the number of seeds actually being delivered to the ground. A monitoring console includes comparison circuit means for monitoring the difference in the number of seeds actually delivered with that of the number of seeds desired to be delivered. The comparison circuit includes means for producing a percent readout indication of each of the rows of seed being planted, this being a percent of efficiency and illustrated to the tractor operator by a series of independent indicating lights. When a first indicating light is energized the farmer knows that the seed planting apparatus is operating within the tolerance efficiency of the desired selection. However, when a second indicating light is lit the farmer knows that the desired tolerance of efficiency is exceeded and the population density of the field of crop will be substantially increased beyond that desired. Similarly, when a third indicating light is lit the farmer knows that the number of seed planted is below the desired number of seed and a corresponding decrease in the efficiency is being obtained. This will produce a reduced population density in the field planted.

9 Claims, 6 Drawing Figures

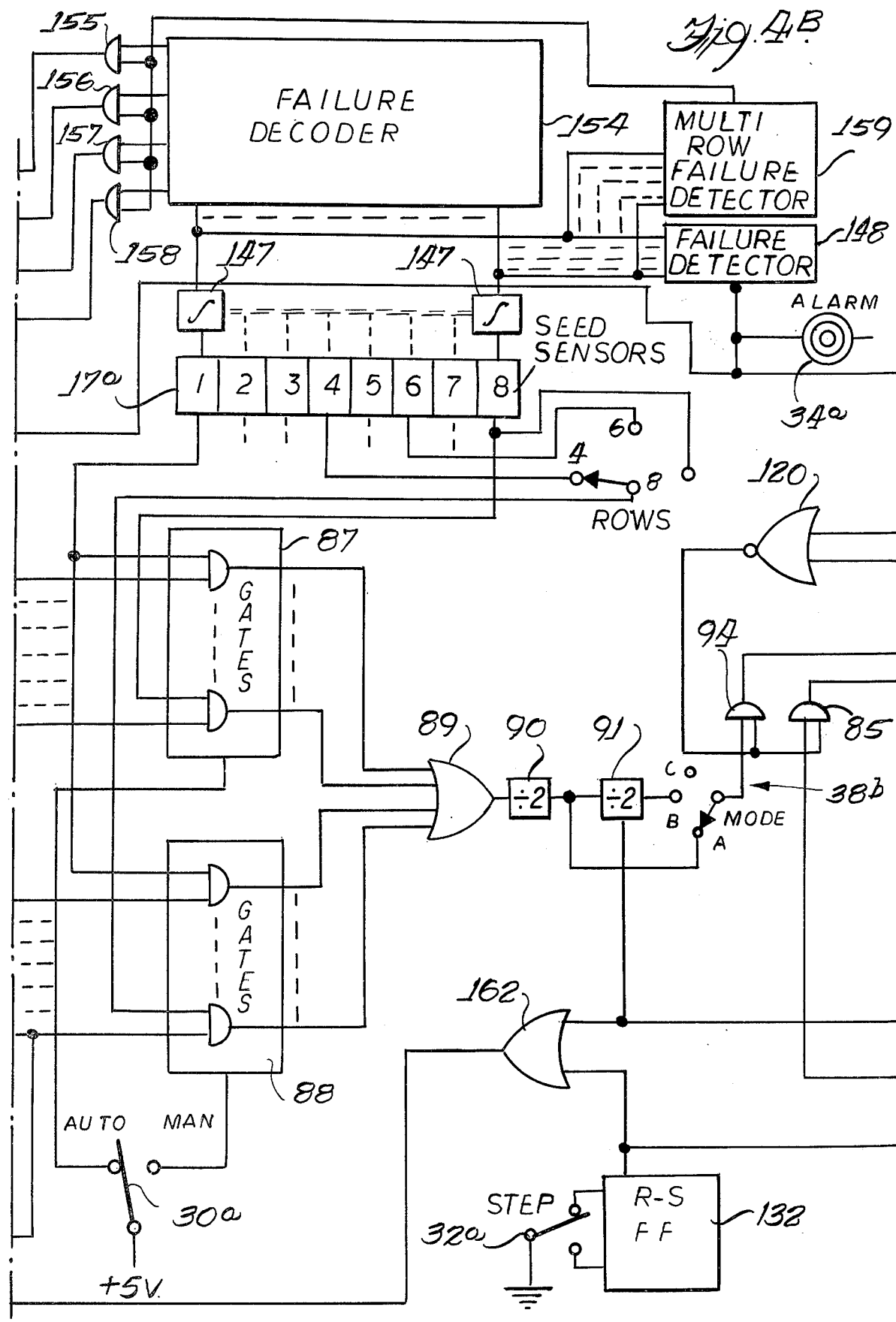

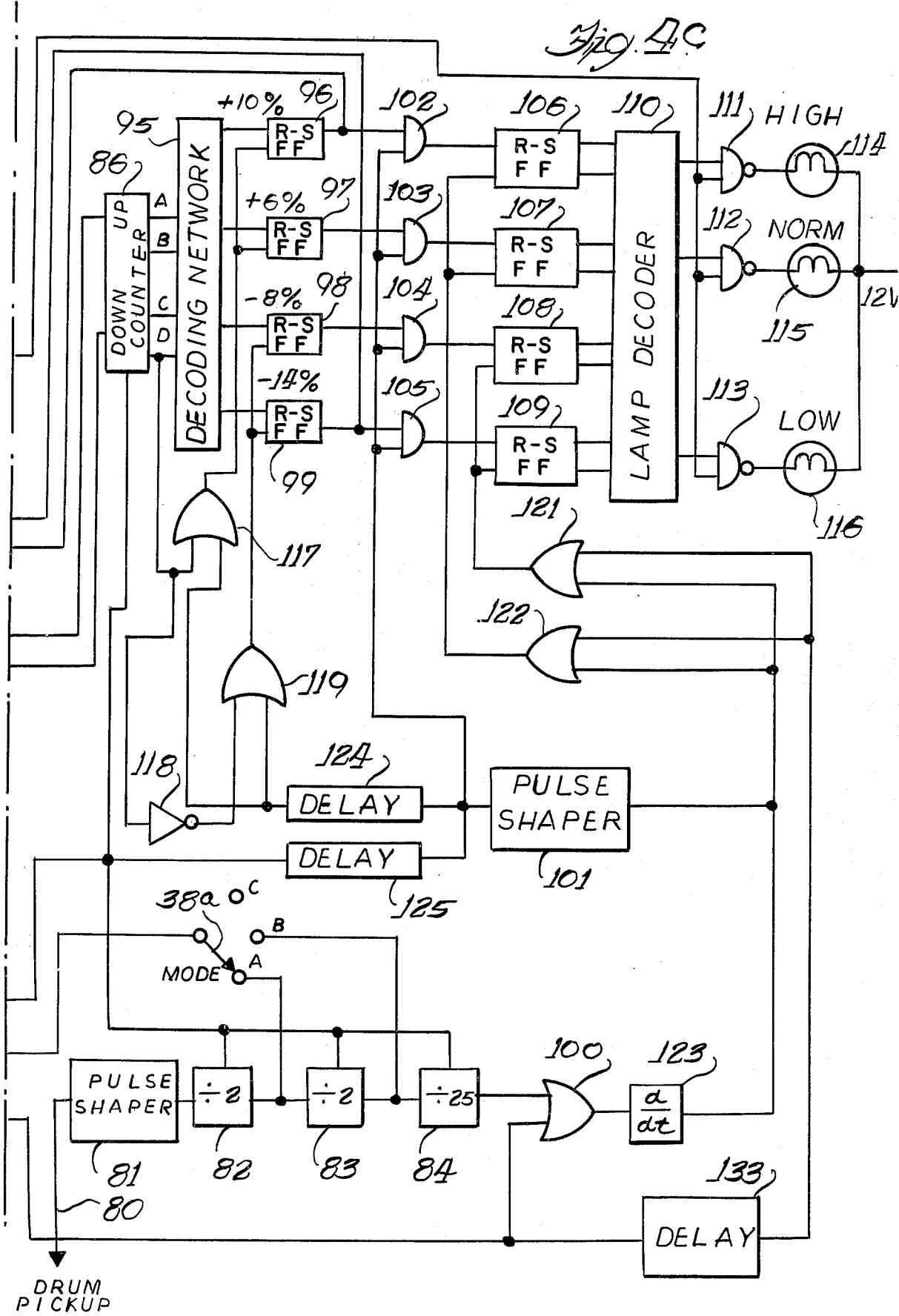

EFFICIENCY MONITORING SYSTEM FOR SEED PLANTING APPARATUS

FIELD OF THE INVENTION

This invention relates generally to seed planting monitoring apparatus, and more particularly to efficiency monitoring apparatus which can be adapted to seed planting machines.

Automatic seed planting apparatus has been developed to facilitate farmers in planting large fields of crops with a minimum of time and manpower. Such seed planting apparatus may be equipped with a plurality of dispensing nozzles so that a plurality of rows of seed can be planted in a single pass over a particular area of the field. For example, four, six, or eight rows can be planted during a single planting operation. This type of relatively sophisticated seed planting apparatus can take substantially any desired form. For example, one type of seed planting apparatus contemplated for use with the present invention is one wherein a single large hopper containing seeds to be planted is positioned over a plurality of side by side seed gathering discs. Each of the seed gathering discs has a plurality of notches or recesses formed about the periphery thereof so that, as these discs pass through the hopper seed is gathered in the recesses of the discs. The discs continue to rotate so that the recess comes in registry with the dispensing tubes through which the seed is delivered and therefrom dispensed to the ground for planting. The number of discs associated with the seed planting apparatus determine the number of rows that can be planted during a single planting operation.

To facilitate delivery of the seed to the ground a power driven blower supplies air under pressure to the seed drum through a directly connected air duct. The hopper and drum pressures are maintained substantially equalized. The seeds are held in the pockets of the revolving discs or drum by pressure differential from the interior of the drum. As the seeds are carried to the top of the seed drum they pass a spring mounted cutoff brush which removes excess seeds so that only the desired number of seed is associated with each of the recesses or pockets of the drum. Near the top of the revolving drum, on the exterior surface, thereof, a seed release wheel contacts each pocket and releases the seed. As the seed is released from the pocket it is caught by the air flow produced by the blower and carried through the discharge manifold to the delivery tubes where they are dispensed in their appropriate rows.

Heretofore, the farmer utilizing multiple row seed planting apparatus would periodically look behind the tractor and visually inspect the plurality of individual seed dispensing nozzles to insure that seed is in fact, being delivered to each of the furrows formed in the ground. Many of the seed planting apparatus include furrow covering devices following the seed planter so that once the seed planting device completes its pass over the ground it is virtually impossible for the farmer to visually inspect the number of seed per unit area without, in fact, digging up the ground.

SUMMARY OF THE INVENTION

Accordingly, it is an object of this invention to provide an automatic monitoring system whereby a farmer need not visually inspect the seed actually being delivered to the ground, but rather observes the relative efficiency of the number of seeds actually delivered by means of a monitoring system in front of the operator.

Another object of this invention is to provide a new and improved apparatus wherein the monitoring console is positioned in front of the operator thereby enabling the operator to maintain his vision on the direction of travel of the tractor vehicle for safe operation thereof.

Another object of this invention is to provide an improved seed monitoring system for seed planting apparatus wherein a malfunction of any one of the plurality of the independent seed delivery systems will produce an audible signal within the monitoring console so that the tractor operator can immediately stop operation to correct the malfunction.

Another object of this invention is to provide an improved seed monitoring system which can be adapted to existing seed planting apparatus by making simple connections and modifications thereof.

Still another object of this invention is to provide an improved seed planting apparatus which not only automatically plants a plurality of rows of seed but also monitors the rows being planted and gives a visual indication of the relative percent of efficiency of the seed planting apparatus.

Another object of this invention is to provide an improved seed planting apparatus wherein the relative percent of efficiency for each individual row of seed being planted is monitored individually and a deficiency in any one of the rows is indicated to the operator by visual readout means.

Many other objects, features, and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIGS. 4A, 4B, and 4C illustrate the details of the electronic wiring diagram of the efficiency monitoring circuitry of this invention.

DETAILED DESCRIPTION OF THE ILLUSTRATED EMBODIMENT

Figure 1:
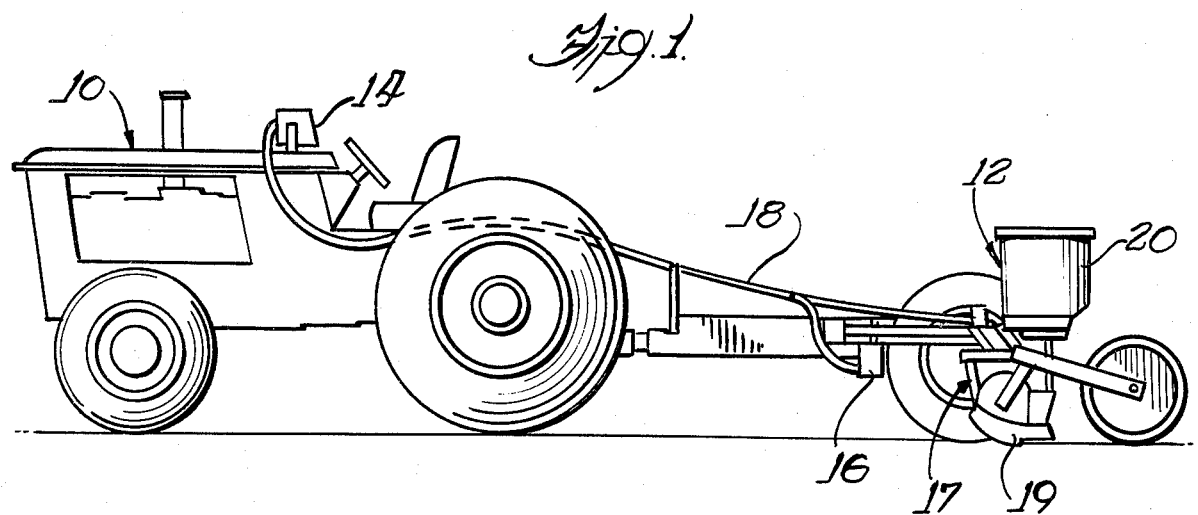
FIG. 1 is a side elevational view of a tractor and seed planting apparatus wherein the seed monitoring system of this invention is utilized.

Referring now to FIG. 1 there is seen a tractor and seed dispensing apparatus wherein the seed monitoring system of this invention is incorporated. Here the tractor is designated generally by reference numeral 10 and the seed dispensing apparatus is designated generally by reference numeral 12. The seed efficiency monitoring system includes a monitoring console 14 mounted on the top of the tractor in full view of the operator so that he need not turn around and look at the seeds flowing from the seed dispensing apparatus 12.

A drum pickup device 16 is located on the frame of seed dispensing apparatus 12 at a convenient location. The drum pickup device 16 provides pulse signal information corresponding to the number of seed desired to be planted from the seed planting apparatus 12. While only a single side view of the seed planting apparatus is here illustrated to show one such seed dispensing nozzle, it will be understood that a number of side by side seed dispensing nozzles can be used, for example, four, six, or eight such nozzles can be used to plant a corresponding number of rows simultaneously. Therefore, a plurality of seed sensors 17 are positioned at the lower end of the seed dispensing apparatus, and each row of the seed dispensing apparatus includes one of such seed sensors. While the drum pickup device 16 produces pulse signal information corresponding to the desired number of seeds planted, the seed sensor 17 produces pulse signal information corresponding to the actual number of seed planted. By interconnecting the drum pickup device 16 and the seed sensor 17 with the monitor console 14 by means of an interconnecting harness 18, the pulse signal information from both the drum pickup and the seed sensor can be compared.

The seed sensor 17 is a photoelectric sensor device mounted in each row of the planter to detect the presence or absence of seed being delivered to the furrow formed by a device 19 or other suitable structure. As seeds pass through the seed sensor 17, a light beam and associated light detector device will produce a pulse signal indicating the passage of such seed.

On the other hand, the drum pickup device 16 utilizes a slotted disc member which is synchronized with the rotation of a seed drum located within or beneath the hopper 20 of the seed dispensing apparatus 12. The seed drum is not here illustrated in FIG. 1. When the drum pickup device is installed a disc is selected to correspond to the correct number of holes formed in the drum dispensing device associated with the seed dispensing apparatus 12. The slots in the rotating disc trigger a photo-electric detector in the drum pickup and the signal is sent to the monitoring console 14 which is proportional to the number of seed holes formed in the seed drum. Therefore, if a seed does not fill the hole of the seed drum no seed will be delivered through the seed delivering system and the seed detector or sensor 17 will not produce an output.

The monitor console 14 therefore has two inputs to compare. One telling the monitor how many seeds should have been dispensed, this number corresponding to the number of holes in the associated seed dispensing drum, and the other input telling the monitor console how many seeds have actually passed into the soil. For example, if 100 drum holes have passed the drum photo-electric detector, 100 seeds should have passed by the photo-electric sensor 17 in each of the planter rows and the planter would be operated at 100% efficiency. If 100 drum holes pass by and only 90 seeds are detected, the particular planter row is now planting 10% less population than desired. Conversely, if 100 drum holes pass the drum pickup detector 16 and 110 seeds are detected by the seed sensor 17 the planter is delivering 10% more than necessary.

The monitoring console 14 includes circuit means to reset itself and give a reading after a predetermined number of drum holes have passed. The monitor console utilizes the comparison of the two inputs to provide a simple, convenient, and accurate display of seed planting efficiency.

Figure 2:
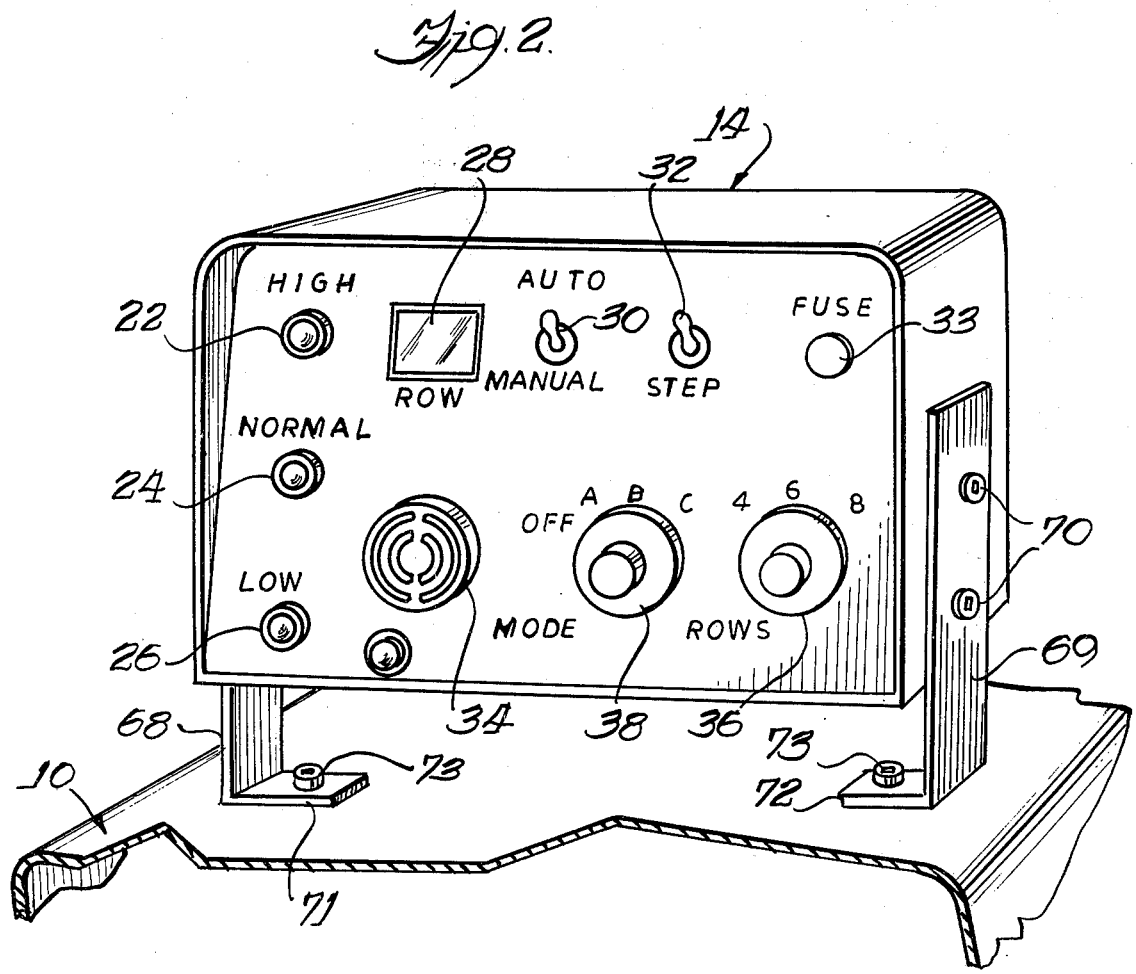
FIG. 2 is a perspective fragmentary view showing the details of the various selector switches and readout means of the monitoring system of this invention and also illustrates the mounting position on the forward end of the tractor in front of the tractor operator.

Referring now to FIG. 2 the details of the monitor console 14 are more clearly illustrated. On the left side of the console are located three indicating lights 22, 24, and 26 respectively indicating a high, normal, and low efficiency of seed planting operation. For example, when planting corn, if the normal lamp is lit, the planter is operating within an efficiency range of plus or minus 5%. If only the top light 22 is energized the planter is over planting by more than 10% from the desired range of efficiency. Coversely, if the lower lamp 26 is energized the planter is under planting by more than 10%. If the normal and high lamps 24 and 22, respectively, are energized at the same time, the planter is planting somewhere between a range of for example, 6% to 10% efficiency. Conversely, if the normal and low indicating lamps 24 and 26, respectively, are energized the planter is under planting by 6% to 10% below the desired range of planting efficiency. The small row indicating window 28, just to the right of the column of indicating lamps provides a digital readout display. The indicating window is labelled Row so that the digits being represented in the window correspond to the row of seed being monitored. For example, if Row 1 appears in the window 28, and the high light is on, it will give an indication to the operator that the seed being planted in Row 1 is 10% higher than the desired efficiency required.

Located directly to the right of the Row indicating window is an auto-manual switch 30 which is in easy reach of the operator for selecting either one of the two modes of operation. With the switch 30 in the auto, which is an abbreviation for automatic, position the monitor automatically scans each row in sequence one after the other. For example, Row 1 would appear in the window for a period of time to give a percent indication by indicating lights 22, 24, and 26. Then Row 2 would be indicated within the window 28 for a second interval during which the indicating lamps 22, 24, and 26 will indicate the relative percent of efficiency of planting for that row, and so on for each of the rows in sequence. When the last row is monitored the system recycles itself. Therefore, as the operator views the row being planted he also sees the condition of the planter efficiency for that particular row. When the auto-manual switch 30 is in the automatic position it will scan each row sequentially for approximately 10 seconds at a speed of approximately 5 miles per hour over the ground.

In the event that the seed dispensing apparatus 12 establishes a malfunction in one of the planting rows an audio signal will be generated by an alarm device 34 located substantially immediately below the viewing window 28. When the alarm signal 34 is energized the viewing window 28 will automatically indicate the number of the row which has malfunctioned regardless of the position of the switch 30. If the operator wants to monitor a particular row because it is reading high or low he can place switch 30 in the manual position and select the desired row by actuation of the step switch 32. This will eliminate sequential scanning of the rows. By clicking the step switch between up and down positions until the row display indicator 28 indicates the row the operator wants to observe, the operator can effect a manual sequencing of the rows being planted. Once the operator has established which row is to be monitored the monitoring console 14 will display only that row from the indicating lights 22, 24, and 26. The system would continue to monitor only the selected single row until such time as the auto-manual switch 30 is again actuated to the automatic position. This therefore, provides a simple and efficient means for the operator to select various modes of operation.

The monitor console 14 is provided with a fusing device 33, located just to the right of the step switch 32 and may incorporate a three amp fuse to protect the various electrical and electronic components within the console unit.

Located directly below the row indicating window 28 is an audible alarm device 34 which will be energized at any particular instance when the seed flow in any row has ceased. This alarm system is provided to detect such malfunctions as seed dispensing nozzles being plugged or other reasons for the absence of seed flow therethrough. If any row fails to plant a seed, regardless of the display in the row window, the audio-alarm device 34 is energized and the circuit within the monitoring console 14 will cause the number of the failed row to automatically appear in the window 28. This overriding alarm feature assures the operator that the planter is planting seed regardless of whether or not the operator is visually monitoring the efficiency lights 22, 24, and 26. In addition, if more than one row fails to plant seed simultaneously, as in the case of a loss of air pressure or excessive brush wear, or scarcity of seed within the hopper, a zero number would appear in the row display window 28. This zero automatically indicates to the operator that the problem is in more than one row and he should diagnose it accordingly.

Also located on the monitor console 14, at the lower right corner thereof, is a selector switch 36 which enables the operator to manually select the number of rows to be monitored. In the illustrated embodiment the selector switch 36 enables the operator to select between four rows, six rows, and eight rows of seed planting to be monitored sequentially in accordance with the principles of this invention. The number of rows to be monitored must be set accurately on the selector switch 36 so that the appropriate electronic circuitry of the monitor console 14 can be operated in the desired manner. For example, for a six row planter the row knob 36 should be positioned to six row position. If this is not done the monitoring system of this invention may not operate properly.

Also located on the front panel of the monitoring console 14 is a mode selector switch 38 which displays four positions of operation of the monitoring system. For example, the four positions may be a totally off position, an A-mode, a B-mode, and a C-mode of operation. When the mode switch 38 is in the off position the entire console is inoperative and no indication of efficiency will be maintained. However, with the mode selector switch 38 in either the A, B, or C position, according to the operator's desire, various seed planting efficiency conditions will be maintained. Also, it will be noted that for proper operation of the seed monitoring system the correlation between the row selector switch 36, the mode selector switch 38, and the appropriate indicating wheel within the drum pickup device 16 must be maintained.

If the wrong drum indicating wheel is mounted within the device 16 an inaccurate reading will be obtained. The correct placement of the mode switch 38 then compares the signals from the drum pickup device 16 and the seed sensors 17 so that the monitor console 14 can make the correct comparison and display the proper percentage of efficiency on the indicating lights 22, 24, and 26. The operator must remember to keep the switch in the correct position for the type seed being planted. For example, in the planting of corn the mode selector switch 38 is to be placed in the A position and in the planting of soybean the mode selector switch 38 is to be placed in the B position.

The same indicating disc within the drum indicator 16 can be used for both corn and soybean, as this disc contains twelve slots about the periphery thereof thus corresponding to a proportional number of slots in the seed planting drum within the seed planting apparatus 12. In position A of the mode selector switch 38 the indicating lamps 22, 24, and 26 indicate an efficiency tolerance suitable only for corn. Similarly, when the mode selector switch 38 is in the B position, the efficiency tolerance indicated by the indicating lamps is suitable only for soybean and a few other selected crops, as indicated by a chart accompanying the efficiency monitoring system.

For example, when planting soybeans, if the normal light 24 is energized, the planter is planting within an efficiency range of plus or minus 10%. If the high lamp is on, the planter is over planting by more than 20% and if the low lamp is on the planter is under planting by more than 20%. When the high lamp 22 and the normal lamp 24 are energized the seed planting apparatus is operating in an efficiency range of between 10 and 20%.

With the mode selector switch 38 in the C position the operation of the indicating lamps 22, 24, and 26 is eliminated and the row display indicates only a failure condition. That is, when a failure of one of the rows occurs and no seed is being planted the audio indicator 34 is energized and the viewing window 28 will indicate which row has, in fact, failed. As mentioned above, if more than one row fails substantially simultaneously a zero reading will be indicated in the viewing window 28.

Figure 3:
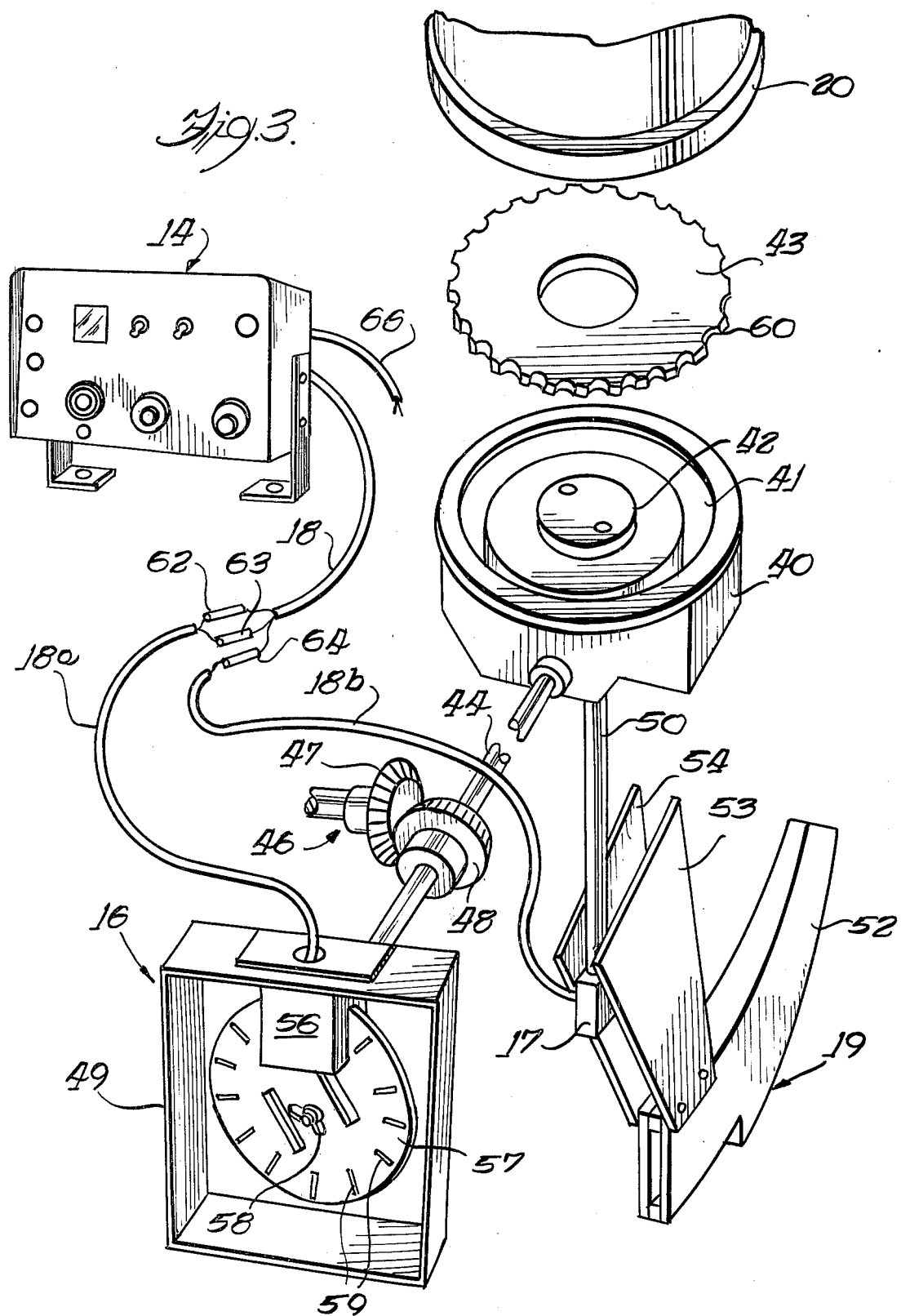
FIG. 3 is a perspective fragmentary exploded view of the various components which constitute the seed monitoring efficiency system of this invention.

Referring now to FIG. 3 the details of the drum pickup device 16 are illustrated. Also, the seed drum associated with the hopper 20 is shown. While the seed drum is here illustrated as being oriented in a horizontal position, it will be understood that seed drums oriented in vertical positions, and a plurality of such drums positioned side by side can be utilized without departing from the general aspects of this invention.

Here the hopper 20 is seen positioned over a base member 40 which, in turn, has an annular recess 41 formed therein. A hub 42 is formed substantially centrally of the housing 40 and engages the seed dispensing wheel 43. While only a single wheel is here illustrated as mentioned above, it will be understood that a plurality of such wheels may be utilized. In that case the seed dispensing wheel will be referred to as a seed dispensing drum. Furthermore, the drum may have a vacumn applied to the interior thereof so that seeds will be attracted to the seed gathering apertures formed therein. The seed gathering wheel 43 is driven by a shaft 44 which, in turn, receives its power from a right angle bevel gear arrangement 46. This bevelled gear arrangement includes a drive gear 47 having bevelled mating teeth thereof engaging a second gear 48. The shaft 44 extends into a housing 49 which constitutes part of the drum pickup device 16. The housing 49 may be mounted at any suitable location on the planter structure. A chute 50 extends downwardly from the base member 40 and is connected to the seed sensing device 17 which is mounted at the lower end thereof.

The furrow forming device 19 includes a plow shaped member 52 secured to depending brackets 53 and 54, they being permanently secured to the seed dispensing structure. The seed sensing device 17 and discharge tube 50 are placed in close proximity to the device 19 which, as positioned here, can be used as a guide member.

In accordance with this invention, a light source and photo-electric responsive means are mounted within the housing 49, they being secured to a support block 56. The light source is mounted on one side of the support block 56 and the photo-electric light responsive device is mounted on the other side of the mounting block 56. A disc member 57 is rotatably secured to the shaft 44 and secured thereto by a wing nut 58. The disc 57 is provided with a plurality of arcuately spaced apart slots or openings 59 formed uniformly about the mere periphery thereof. As the slots or openings 49 pass between the light source and the photoelectric light responsive device mounted to the block 56, pulse signal information is generated as a result. This pulse signal information corresponds substantially to the number of seed receiving detents 60 formed in the wheel 43, or any multiple thereof. For example, if the seed receiving detents are 60 in number there may be thirty openings 59 formed in the wheel 57.

The monitor console 14 receives the signal information from the drum output unit 16 over the cable 18, here being a cable extension portion 18a connected by means of a pair of multi-conductor connectors 62 and 63. Pulse signal information from the seed sensor 17 is delivered over a cable 18b and coupled through a multi-conductor connector 64. By so providing interconnecting cables for the various components of the seed monitoring system of this invention the unit can be adapted to any existing seed planting apparatus. Power for operating the electronic components of the system is obtained by a cable 66 which may be connected to the 12 volt battery supply of the tractor upon which the monitoring console 14 is secured.

As best seen in FIG. 2 the monitoring console 14 is secured to the top portion of the tractor 10 by a pair of L-brackets 68 and 69, each having a pair of spaced apart socket head fastening screws 70 located at the upstanding portion thereof. A pair of inwardly turned leg portions 71 and 72 are formed on the brackets 68 and 69, respectively, and receive socket head fastening screws 73 therethrough. While this particular form of mounting bracket is best suited for the monitoring console of this invention it will be understood that other forms of mounting the console to the tractor may be incorporated.

Figure 4A:
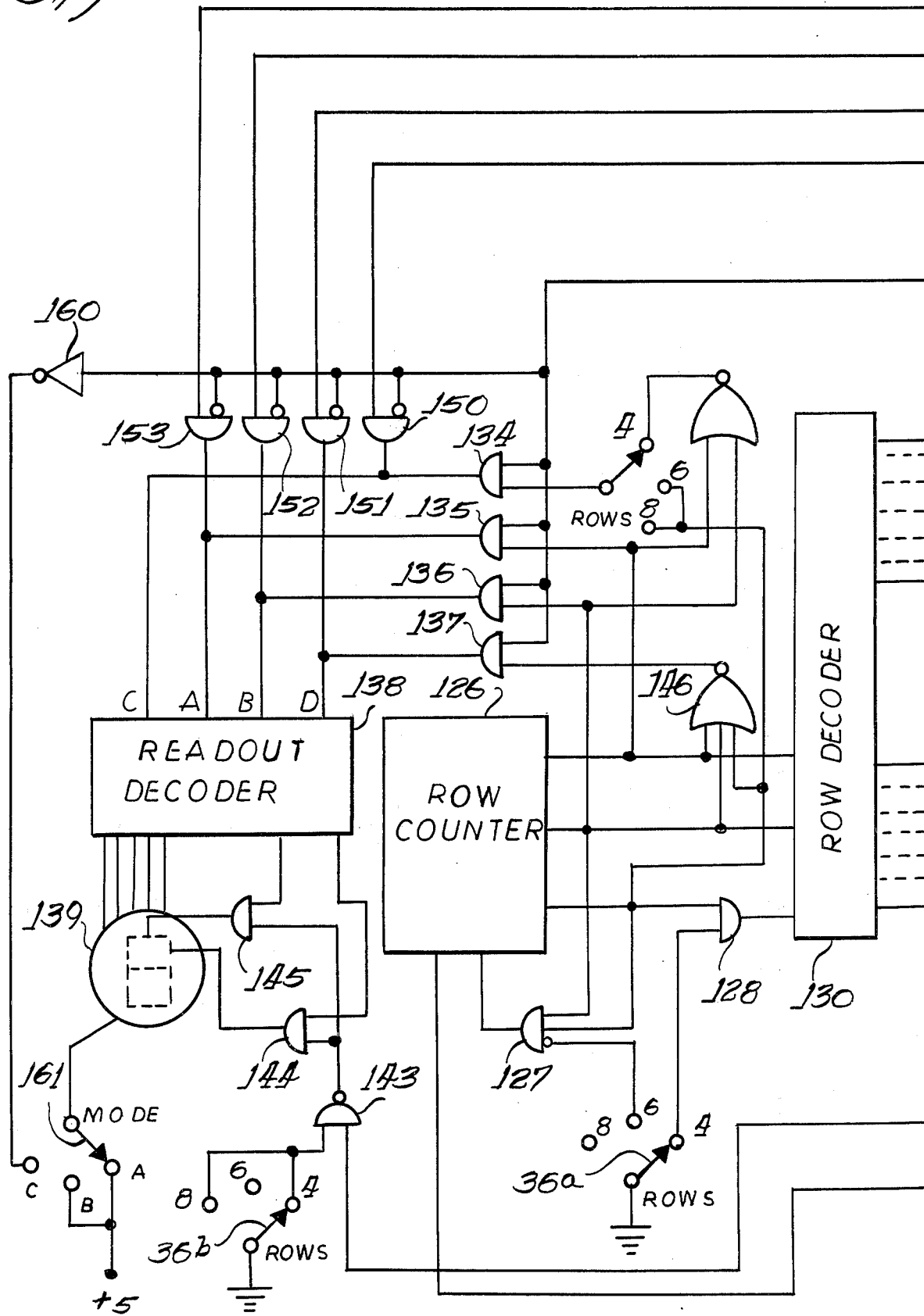

Referring now to FIGS. 4A, 4B, and 4C the details of the circuit diagram are here illustrated. The signals developed by the drum pickup 16 is delivered to a drum pickup input line 80, FIG. 4C. The signal on the drum pickup input line 80 is delivered to a pulse shaper circuit 81 and therefrom to a series of divider circuits 82, 83, and 84. The drum pulse signals are selected from the output of the divider circuits 82 and 83, depending on the position of the movable contact associated with the mode switch 38a. The positions A, B, and C correspond to the positions A, B, and C of the mode switch 38 shown in FIG. 2. This will be the case in all instances where the mode switch contacts are illustrated. Also the row selector switch 36 of the monitoring console 14 will be identified in the same manner in the schematic arrangement in FIGS. 4A, 4B, and 4C.

The output signal from the mode selector switch 38a is delivered over a line to one input of an up-down counter circuit 86 through an AND gate 85, shown in FIG. 4B. The signal from the seed sensor 17, here being designated generally by reference numeral 17a and illustrating a plurality of seed sensors corresponding to the number of rows to be planted, passes through a row selector to integrated circuit packages 87 and 88 to an OR gate 89. The output of the OR gate 89 is divided by a pair of dividers 90 and 91. The mode selector switch 38b selects the proper division ratio of the pulse signal information and applies the resulting signal to an AND gate 94 and therefrom to the up-down counter 86.

The up-down counter 86 is a four-bit binary counter which is reset to a count of 0000 at the beginning of each computing cycle. Seed pulse signal information is applied to its up input and drum pulse signal information is applied to its down input. Therefore, one of the signals applied thereto tends to cause the counter to count in one direction while the other of the signals applied thereto tends to cause the counter to count in the other direction. If the number of input signals of each different kind of signal are the same then the counter remains substantially centered. That is, if the number of drum pulses equals the number of seed pulses the output of the counter will remain at 0000. If the seed pulses exceed the drum pulses the counter will count upward 0001, 0010, 0011, etc. The divider circuits 82, 83, and 84 are arranged along with divider circuit 90 so that when the mode switch 38 is in the A position the computing cycle is effectively 50 down counts to produce an output. When the output of the up-down counter 86 reaches a count of 0011, the number of seeds are 3/50 or 6% above normal. A decoding network 95 is connected to the output of the up-down counter 86 and is arranged to sense a count of 001 and set the plus 6% flip-flop circuit 97. A plurality of other flip-flop circuits associated with the output of the decoding network 95 are used to set other percentage deviation readings. For example, a flip-flop circuit 96 is set to indicate a plus 10% deviation from the required seed planting setting. Another flip-flop circuit 98 indicates a minus 8% deviation from the desired seed planting setting while still another flip-flop circuit 99 indicates a minus 14% deviation. It will be understood that these particular percentages can be changed without departing from the spirit and scope of this invention. It will be noted that if the number of down counts exceeds the number of up counts, the counting sequence is 0000, 1111, 1110, 1101, 1100, etc. Therefore, a count of 1100 (12) is equivalent to a count of minus 4. Since minus 4/50 equals minus 8% the flip-flop circuit 98 will be actuated to produce an output signal to give this percent reading indication.

When the mode selector switch 38 is in the B position the seed and drum pulse division ratios are adjusted for an effective computing cycle of 25 counts down. Thus a count of 3 on the up-down counter corresponds to a 12% deviation, thereby doubling the percentage range which the indicating lights on the monitoring console represent.

At the end of a computing cycle the output of divider circuit 84 passes through an OR gate 100, and therefrom through a differentiator circuit 123 and pulse shaper circuit 101. The output of the pulse shaper circuit 101 is delivered to one of the inputs of a plurality of AND gates 102, 103, 104, and 105, which have the other inputs thereof coupled to the outputs of the flip-flop circuits 96, 97, 98, and 99, respectively. This causes the output signals of the flip-flops to be transferred to a plurality of memory flip-flop circuits 106, 107, 108, and 109, respectively. Connected to the output of the memory flip-flop circuits 106–109 is a lamp decoder converter circuit 110 which converts the information from the memory flip-flops to enable the correct combination of NAND gates 111, 112, and 113 which, in turn, energize their associated indicating lamps 114, 115, and 116, respectively.

If during the computing cycle the seed pulses from the seed sensor 17 exceed the drum pulses from the drum pickup device 16 so that the 6% flip-flop circuit 97 is set the drum pulses begin to outnumber the seed pulses so that the up-down counter 86 has the output thereof pass through a count of 0000 in the downward direction to 1111. The transition from the D-bit output of the counter 86 causes the 6% flip-flop circuit 97 to be reset through an OR gate 117. If, on the other hand, the negative 8% flip-flop circuit 98 is set due to a shortage of seed pulses as compared to the number of drum pulses, and then the counter output recovers through the 0000 output configuration in an upward direction to a 0001 state, the 8% flip-flop 98 is reset through the invertor 118 and OR gate 119.

If, at any time during the computing cycle, the plus 10% or minus 14% flip-flop circuits 96 and 99, respectively, are set, AND gates 85 and 94 are disabled through the NOR gate 120. Therefore, for the remainder of the cycle there are no seed or drum input signals to the counter 86, and at the end of the cycle either a high or a low lamp 116 or 114, respectively, will be lit.

The end of the computing cycle is signalled by the output of divider circuit 84. At this time the following sequence of operation takes place. First the output of OR gate 100 is differentiated by the differentiating circuit 123 to enable the OR gates 121 and 122 to reset the memory flip-flop circuits 106, 107, 108, and 109. Secondly, the narrow pulse from differentiator circuit 123 is widened by the pulse stretcher circuit 101 to enable AND gates 102, 103, 104, and 105. At this point the information in the flip-flop circuits 96, 97, 98, and 99 is transferred to the memory flip-flop circuits 106, 107, 108, and 109, respectively, and the proper combination of indicating lights is energized. Thirdly, the pulse from the pulse shaper circuit 101 is delayed by a delay network 124 long enough for the transfer of information from the flip-flop circuits 96-99 to the memory flip-flop circuits 106–109. At the end of this delay the flip-flop circuits 96, 97, 98, and 99 are reset through the OR gates 117 and 119. Finally, the output of a delay network 125 is used to reset the up-down counter 86 and the divider circuits 82, 83, and 84 as well as the divider circuit 91.

When the auto-manual switch 30, FIG. 2, is in the automatic position the monitor console 14 automatically scans the rows being planted from row to row in a sequential manner. The readout remains on one digit for a complete computing cycle for each element or segment of the scan. However, the digit displayed in the row window 28 is that of the row which was computed during the previous computing cycle, and the row presently being counted is the displayed digit plus one. For example, if the readout indicates a three in the monitor window 28 the monitor is at that moment computing the requirements of Row 4, and displaying the planting efficiency of previously counted Row 3. When the auto-manual switch 30 is in the manual position the Row being displayed is the row being counted. The planting efficiency shown by the indicator lights is for the previous computing cycle and is updated at the end of each cycle during the automatic condition.

The row selected for counting is determined by the row counter 126, FIG. 4A. The operation of the row counter 126 is best understood from the table below which indicates the relationship between the selected row, the readout, and the row counter outputs.

|  | Row Counter Output | Selected Row Auto | Selected Row Manual | Displayed Row |
|---|---|---|---|---|
| Row Switch at "4" | 001 | 4 | 1 | 1 |
|  | 010 | 1 | 2 | 2 |
|  | 011 | 2 | 3 | 3 |
|  | 000 | 3 | 4 | 4 |
| Row Switch at "6" | 001 | 6 | 1 | 1 |
|  | 010 | 1 | 2 | 2 |
|  | 011 | 2 | 3 | 3 |
|  | 100 | 3 | 4 | 4 |
|  | 101 | 4 | 5 | 5 |
|  | 000 | 5 | 6 | 6 |
| Row Switch at "8" | 001 | 8 | 1 | 1 |
|  | 010 | 1 | 2 | 2 |
|  | 011 | 2 | 3 | 3 |
|  | 100 | 3 | 4 | 4 |
|  | 101 | 4 | 5 | 5 |
|  | 110 | 5 | 6 | 6 |
|  | 111 | 6 | 7 | 7 |
|  | 000 | 7 | 8 | 8 |

The length of the row count cycle is the same as the number of planter rows and is set by the row selector switch 36. When the row selector switch 36a, FIG. 4A, is set at a four row position, a gate circuit 128 is disabled so that the row counter 126 effectively has a cycle of four counts. If the row selector switch 36a is set to engage the 6 row position contact a gate circuit 127 is enabled and supplies a reset pulse to the row counter when the counter outputs reach a 110 state. The reset pulse returns the counter to 0000 and the cycle repeats. If the row selector switch 36a is now set to engage the 8 row position contact the row counter operates in its normal 8 count cycle as none of the outputs thereof are disabled. This can be accomplished by a standard 3-bit binary counter.

A row decoder circuit 130 converts the three line output of the row counter 126 to enable the proper AND gate in the integrated circuits 87 and 88. Automatic manual switch 30a enables the integrated circuit 87 or 88 to agree with either the auto or manual table listed above. In the auto position the pulse used to advance the counter 126 comes through an OR gate 162 from the delay circuit 125.

In the manual position of the auto-manual switch the desired row to be monitored can be selected by momentarily depressing the step switch 32a, FIG. 4B, to produce an output pulse from a flip-flop circuit 132. The flip-flop circuit 132 eliminates the contact bounce of the switch so that a single step function is obtained by actuation of the switch. The output of the flip-flop circuit 132 is coupled through OR gate 100 to initiate the reset sequence previously described. Since, in the manual position, the flip-flop circuits 96, 97, 98, and 99 contain information about the row being displayed, not the next row to be displayed, and depressing of the step switch 32a also advances the display by one count, it is necessary to erase the information transferred to the memory flip-flop circuits 106, 107, 108, and 109. This erase function is accomplished by delaying the pulse from the flip-flop circuit 132 in a delay circuit 133. The delayed pulse is then applied to OR gates 121 and 122 to reset memory flip-flop circuits 106, 107, 108, and 109. The output of the flip-flop circuit 132 is also coupled through OR gate 162 to set the row counter 126 to the next row.

The binary outputs of the row counter 126 are connected to readout decoder circuit means 138 through a plurality of AND gates 134, 135, 136, and 137. The readout decoder circuit 138 converts the binary input signal information into signals required to drive a seven segment readout indicating device 139. It will be noted from the above table that the highest number row is displayed when the output of the counter 126 is 000. Therefore, if the row selector switch 36 is in a four row position the counter output of 000 will produce a four within the readout device 139 When the row selector switch is in the six row position an output of the counter 126 of 000 will produce a six at the readout device 139. In like manner, with the selector switch 36 in the eight row position, an output signal of 000 from the row counter 126 will produce a 8 at the readout device 139.

If the row selector switch 36b is in the six position a NAND gate 143 is enabled. Therefore, when the row decoder circuit 130 produces an output at the lower most line thereof it will indicate that the row counter 126 is at a count of 000, and AND gates 144 and 145 prevent the two indicating segments of the readout 139 from being energized. Therefore, the readout device 139 is attempting to energize all seven readout elements thereof to form a figure 8, but NAND gates 144 and 145 prevent the necessary two segments from lighting thereof providing a figure 6 to be displayed.

With the row selector switch 36 in the eight row position the row counter 126 functions normally as a three-bit binary counter. When a count of 0000 is present the NOR gate 146 makes the D-input of the readout decoder 138 a binary one through the AND gate 137. Therefore, the display reads a figure 8.

As mentioned earlier the circuit configuration of FIGS. 4A, 4B, and 4C is adapted to accommodate a plurality of separate seed planting sensing devices 17, one sensing device for each row of seed being planted. Therefore, a plurality of integrator-level comparitor circuits 147 are arranged to receive output pulse signal information from each one of a plurality of seed sensors 17a, they being labelled in a row 1–8. The integrator-level comparitor circuits 147 provide an output signal when the seed rate falls below approximately 1.5 seeds per second. If one or more of the rows 1–8 fail to produce seed at the rate of 1.5 seeds per second the fail detector circuit 148 is energized and in turn will sound an alarm, here being designated by reference numeral 34a. The alarm 34a corresponds to the audio-alarm device on the front panel of the monitoring console 14 of FIG. 2. The output of the failure detector circuit 148 is also delivered over a line to a plurality of AND gates 150, 151, 152, and 153, and to the AND gates 134, 135, 136, and 137. Inverter circuits are indicated at the input of AND gates 150, 151, 152, and 153. Therefore AND gates 150, 151, 152, and 153 are enabled while AND gates 134, 135, 136, and 137 are disabled. Thus, the signal to the readout decoder circuit 138 is now supplied from the failure detector circuit 154 instead of the counter circuit 126. The failure decoder circuit 154 converts the signal from the integrator-level detector circuit 147 to a binary form for application to the readout decoder 138 through the AND gates 150, 151, 152, and 153, and through a plurality of AND gates 155, 156, 157, and 158.

A multiple row failure detector circuit 159 is associated with the plurality of gates 155, 156, 157, and 158, and is arranged to provide an output when more than one row of seed planting fails to occur. The signal from the multi-row failure detector circuit 159 is delivered to the AND gates 155, 156, 157, and 158 to force the outputs thereof to a zero binary condition. Therefore, the inputs to the readout decoder circuit 138 will be set at a binary zero state and displayed as a zero at the window 28 of FIG. 2.

If the mode selector switch 161 FIG. 4A, is in either the A or B position the readout circuit 139 is enabled to give the proper numerical indication in the window 28. However, if the mode selector switch 161 is in the C position the readout is enabled only if a failure is indicated by the output of the failure detector circuit 148, which delivers such readout through an invertor circuit 160 through the mode switch 161.

The percent efficiency indicator lamps 114, 115, and 116 are deenergized when a failure occurs. The failure is indicated by the output of the failure detector circuit 148 which, in turn, is coupled to the input of the NAND gates 111, 112, and 113. Therefore, should all of the percent efficiency indicator lamps be extinguished the operator of the tractor immediately knows to look at the window 28 to determine which one or more of the rows of seed planting has failed to operate properly.

While a single embodiment of the present invention has been illustrated herein it will be understood that numerous variations and modifications may be effected without departing from the spirit and scope of the novel concepts as set forth in the accompanying claims.

The invention is claimed as follows:

1. An efficiency monitoring system for seed planting apparatus, comprising in combination: first signal producing means adapted to be connected to the seed planting apparatus to produce first signal information which corresponds to the desired number of seeds to be planted during a planting operation, second signal producing means adapted to be connected to the seed planting apparatus to produce second signal information which corresponds to the actual number of seeds being planted during said planting operation, comparison circuit means coupled to said first and second signal producing means for receiving and comparing said first signal information with said second signal information, and readout means coupled to said comparitor circuit means, said readout means includes three indicating lights, a first indicating light to give a normal indication wherein the number of seeds actually planted corresponds substantially to the number of seeds intended to be planted, a second indicating light to give a high indication when the number of seeds actually planted exceeds the number of seeds intended to be planted by a predetermined percentage, and a third indicating light to give a low indication when the number of seeds acutally planted is less than the number of seeds intended to be planted by a predetermined percentage, circuit means for effecting simultaneous energization of said first and second indicating lamps to indicate the number of seeds actually being planted is more than the number of seeds desired to be planted but less than said predetermined percentage in excess thereof, said circuit means also effecting simultaneous energization of said first and third indicating lamps to indicate that the number of seeds actually planted is less than the number of seeds desired to be planted, but more than said predetermined percentage of seeds less than the number of seeds intended to be planted.

2. In the efficiency monitoring system for seed planting apparatus as set forth in claim 1, wherein selector switch means are connected in circuit with said first and second signal producing means to select the number of rows to be monitored during the planting operation, said selector switch means being manually operated to effect such selection.

3. In the efficiency monitoring system for seed planting apparatus as set forth in claim 2, wherein said selector switch means allows manual selection of either four rows, six rows, or eight rows to be monitored.

4. An efficiency monitoring system for seed planting apparatus, comprising in combination: a monitoring console to be mounted on a vehicle in full view of an operator, said monitoring console including visual readout means for indicating the relative percent efficiency of seed planting apparatus being operated, a signal producing pickup device to be mounted to the seed planting apparatus to produce signal information corresponding to the desired number of seeds to be planted in each row of a plurality of rows, a plurality of seed sensing devices to be mounted on said seed planting apparatus, each of said seed sensing devices being associated with one row of seed being planted and wherein the seeds from the seed planting apparatus pass through the seed sensing device, said seed sensing device producing signal information which corresponds to the actual number of seeds being planted, said monitoring console including, three indicating lights, a first indicating light to give a normal indication wherein the number of seeds actually planted corresponds substantially to the number of seeds intended to be planted, a second indicating light to give a high indication when the number of seeds actually planted exceeds the number of seeds intended to be planted by a predetermined percentage, and a third indicating light to give a low indication when the number of seeds actually planted is less than the number of seeds intended to be planted by a predetermined percentage, and circuit means for effecting simultaneous energization of said first and second indicating lamps to indicate the number of seeds actually being planted is more than the number of seeds desired to be planted but less than said predetermined percentage in excess thereof, said circuit means also effecting simultaneous energization of said first and third indicating lamps to indicate that the number of seeds actually planted is less than the number of seeds desired to be planted, but more than the number of seeds desired to be planted, but more than said predetermined percentage of seeds less than the number of seeds intended to be planted, and an interconnecting harness for electrically connecting said console, pickup device, and said seed sensors together.

5. In the efficiency monitoring system for seed planting apparatus as set forth in claim 4, further including readout means associated with said monitoring console to give visual indication of the particular row of seed then and there being monitored and displayed by said first, second, and third indicating lights.

6. In the efficiency monitoring system for seed planting apparatus as set forth in claim 4, wherein said monitoring console includes selector switch means connected to said circuit means to select the number of rows to be monitored during the planting operation, said selector switch means being manually operated to effect such selection.

7. In the efficiency monitoring system for seed planting apparatus as set forth in claim 6, wherein said selector switch means allows manual selection of either four rows, six rows, or eight rows to be monitored.

8. An efficiency monitoring system for seed planting apparatus, comprising in combination: first signal producing means adapted to be connected to the seed planting apparatus to produce first signal information which corresponds to the desired number of seeds to be planted during a planting operation, second signal producing means adapted to be connected to the seed planting apparatus to produce second signal information which corresponds to the actual number of seeds being planted during said planting operation, comparison circuit means coupled to said first and second signal producing means for receiving and comparing said first signal information with said second signal information, and readout means coupled to said comparitor circuit means, said readout means including first and second indicating means, said first indicating means giving a normal indication when the number of seeds actually planted corresponds substantially to the number of seeds intended to be planted, and said second indicating means giving a high indication when the number of seeds actually planted exceeds the number of seeds intended to be planted by a predetermined percentage, and circuit means for effecting simultaneous energization of said first and second indicating means to indicate the number of seeds actually being planted is more than the number of seeds desired to be planted but less than said predetermined percentage in excess thereof.

9. An efficiency monitoring system for seed planting apparatus, comprising in combination: first signal producing means adapted to be connected to the seed planting apparatus to produce first signal information which corresponds to the desired number of seeds to be planted during a planting operation, second signal producing means adapted to be connected to be seed planting apparatus to produce second signal information which corresponds to the actual number of seeds being planted during said planting operation, comparison circuit means coupled to said first and second signal producing means for receiving and comparing said first signal information with said second signal information, and readout means coupled to said comparitor circuit means, said readout means including first and second indicating means, said first indicating means giving a normal indication when the number of seeds actually planted corresponds substantially to the number of seeds intended to be planted, said second indicating means giving a low indication when the number of seeds actually planted is less than the number of seeds intended to be planted by a predetermined percentage, and circuit means for simultaneous energization of said first and second indicating means to indicate that the number of seeds actually planted is less than the number of seeds desired to be planted but more than said predetermined percentage of seeds less than the number of seeds intended to be planted.

* * * * *